July 8, 1941.　　　　C. SHAW　　　　2,248,441

BORING HEAD

Filed March 27, 1939　　　　2 Sheets-Sheet 1

Claude Shaw
INVENTOR

BY Victor J. Evans & Co.
ATTORNEYS

WITNESS

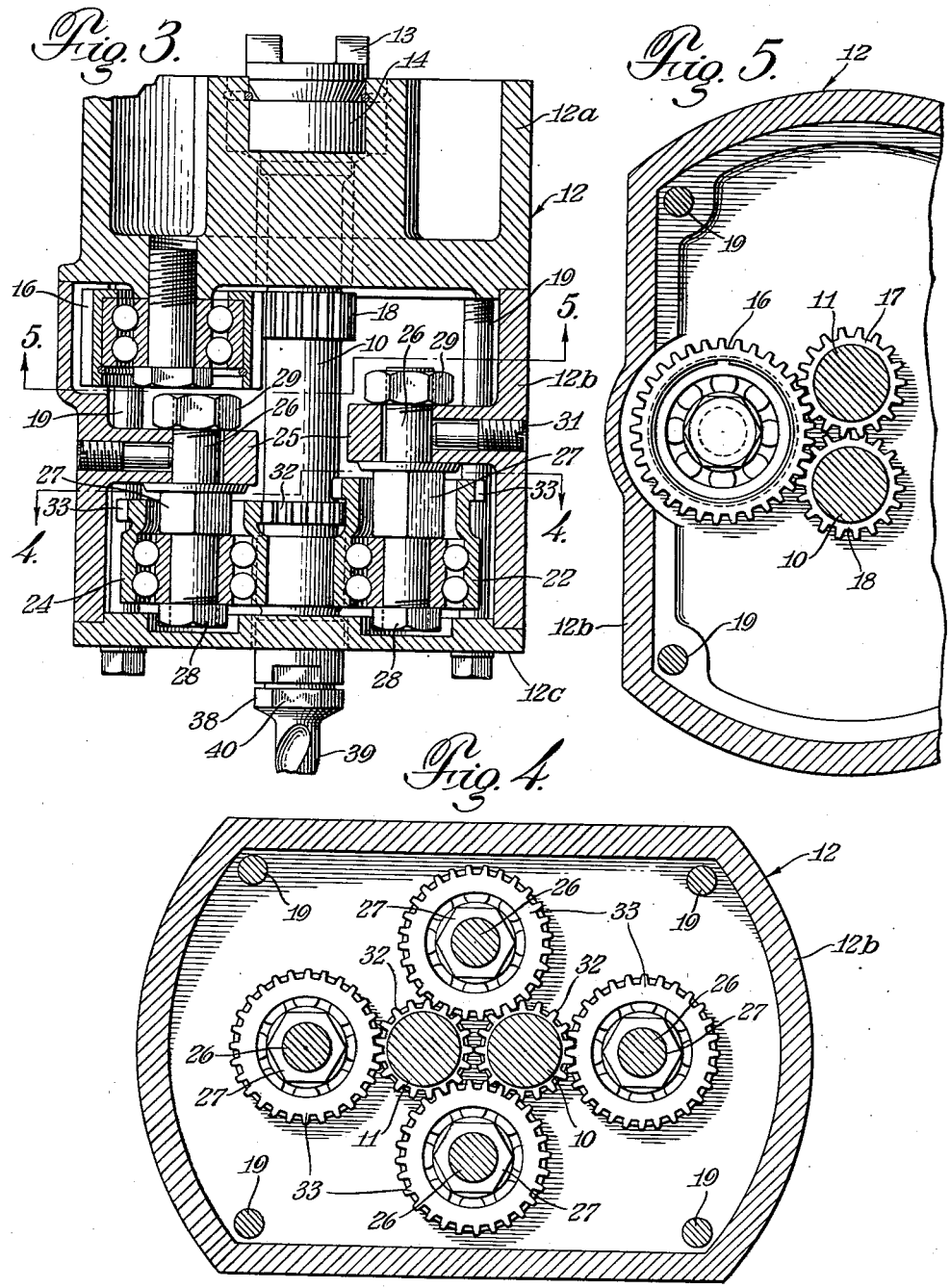

Patented July 8, 1941

2,248,441

UNITED STATES PATENT OFFICE 2,248,441

BORING HEAD

Claude Shaw, Bristol, Va.

Application March 27, 1939, Serial No. 264,444

6 Claims. (Cl. 77—22)

The object of the invention is to provide a boring head in which high speed for the boring spindle can be secured without likelihood of much wear in the bearings, so that trueness of the spindle for a comparatively long time may be maintained; to provide a boring head in which the high speed over a long life is possible with a plurality of spindles adapted to bore on closely related centers; to provide a construction of the kind indicated in which bearing adjustment is easily effected to compensate for wear; to provide a boring head including anti-friction bearings of which the rotary element or member is positively driven to insure rotation of such member under conditions where the viscosity of the lubricant employed may tend to cause the member to drag; and generally to provide a boring head which is highly efficient for high speed but which is relatively simple in construction and susceptible of comparatively cheap manufacture.

Figure 1:
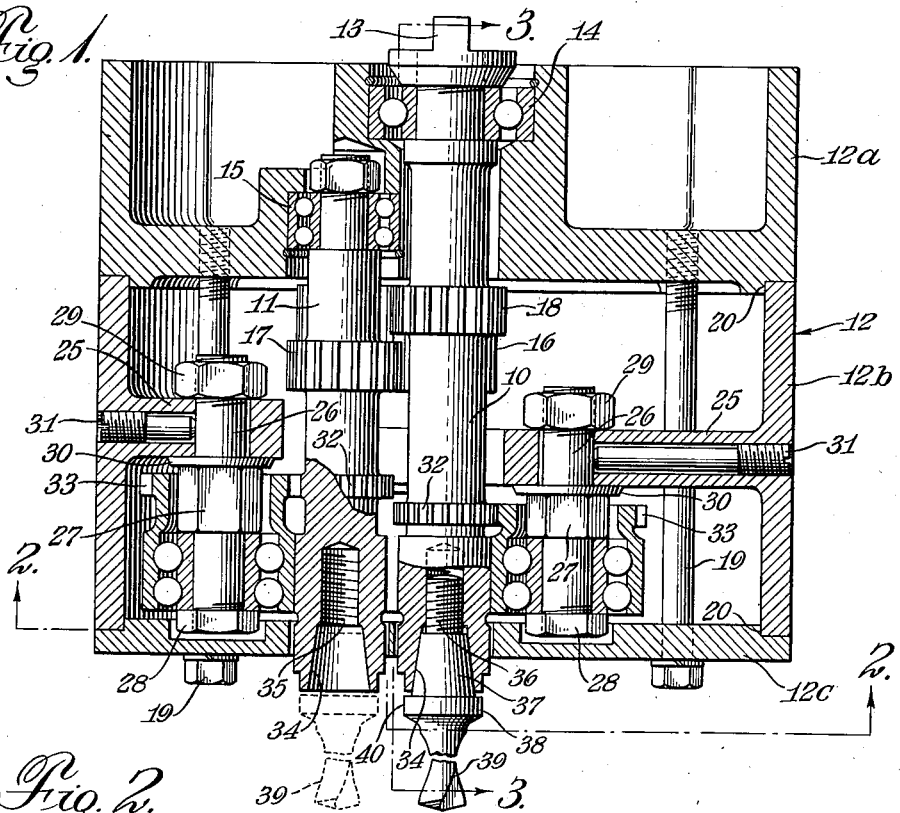

With this object in view, the invention consists in a construction and combination of parts of which a preferred embodiment is illustrated in the accompanying drawings:

Figure 1 is a sectional view of the invention in the plane of the axes of the spindles.

Figure 2:
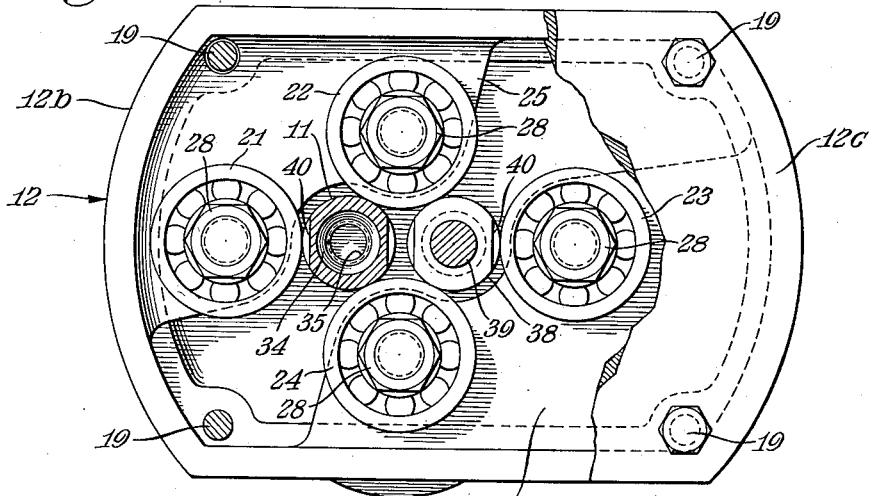

Figures 2 and 3 are sectional views in the planes indicated by the lines 2—2 and 3—3 respectively of Figure 1.

Figures 4 and 5 are sectional views in the planes indicated by the lines 4—4 and 5—5 respectively of Figure 3.

In the illustrated embodiment of the invention, the drill spindles are two in number and are arranged in closely related axial parallelism, the spindle 10 being longer than the spindle 11 so as to protrude from the rear of the housing 12 at the heel end where it is provided with a coupling member 13 for connection with a driving motor or other actuating means. Both spindles, at their rear ends, rotate in antifriction bearings of which the bearing 14 is to the rear of the bearing 15, both, however, being disposed in suitable housings formed in the case 12. The two spindles are connected for synchronous movement by means of an idle gear 16 meshing with the gears 17 and 18 carried by the spindles 11 and 10 respectively, the idle gear having face width equal to twice the face width of either the gears 17 or 18, so that while the latter may overlap due to the close relation of the spindles, the two may be operatively connected for rotation angularly in the same direction.

The case 12 is composed of the base section 12a, the chamber section 12b and the cap 12c, the three being held in assembled relation by means of the cap screws 19, passing through the cap and threading into the base section, the cap and base sections being shouldered, as indicated at 20, to receive the chamber section which is of annular form and seats against the cap and base and abuts the shoulders.

The forward bearings for the spindles consist of conventional anti-friction bearings similar to the rear bearings 14 and 15 but are mounted to operate so that the outer ring sections constitute the rotary elements and the inner ring sections the stationary elements, the reverse of the manner of operation of the bearings 14 and 15 in which the outer ring elements are stationary and the inner ring elements rotate with the spindles.

There being two spindles, the forward bearings are four in number, as indicated at 21, 22, 23 and 24, and these are arranged in a substantially circular series around the two spindles so that the outer ring members of the bearings are tangential to the journals of the spindles, the bearing 21 contacting only with the journal of the spindle 11 and the bearing 23 only with the journal of the spindle 10, while the bearings 22 and 24 contact each with the journals of both spindles.

The mounting means for the bearings, 21, 22, 23 and 24 consists of webs 25 formed on the interior wall of the chamber section 12b and studs 26 carried by the webs and supporting the bearings, the studs 26 having a cross-sectionally angular intermediate shouldered portion 27 which abuts the inner ring of the bearing which it carries, that portion of the stud projecting from the shouldered portion and passing through the bearing receiving a nut 28 which secures the bearing on the stud. The opposite portion of the stud on the other side of the shouldered portion passes through a body hole in the web and receives a retaining nut 29 on its threaded extremity, a washer 30 being interposed between the shouldered portion 27 and the web. The hole in the web through which the stud passes is bored full so as to exceed in diameter the diameter of the stud, the excess in dimension being sufficient to provide material lateral adjustment of the stud, so that the supported bearing may be adjusted laterally or in or away from the spindle.

Inward adjustment must be effected with great nicety, so as to secure the proper contact with the spindle journal and to provide for this, the chamber section carries adjusting screws 31, these being mounted radially in the chamber section and having their pilots extending centrally through the webs to bear on the web carried section of the stud. Thus slight loosening of the nuts 29 and the subsequent turning of the adjusting screws 31 will effect inward movement of the studs and with them the bearings. Of course rough adjustment of the bearings is effected without the use of the adjusting screws and obviously at a time when the chamber section is detached from the remaining sections, so as to provide for access to the nuts 29 and 28 as well as the shouldered portions 27. By making the shouldered portions 27 of cross-sectionally angular form, provision is made for a wrench seat thereon to hold the stud while either the nut 28 or nut 29 is being tightened.

When the casing sections are assembled, the chamber section houses the necessary lubricant for the apparatus and this is preferably lubricant high in viscosity.

In low temperature, the lubricant medium will likely congeal and it might be that the bearings 21 to 24 inclusive would not rotate upon starting of the spindles were provision not made to positively insure their rotation. The failure to rotate initially would result in wear to the spindle journals or to the bearings themselves, so that the life of the boring head may be materially reduced. With the provision for positive rotation of the rotary elements of the bearings, however, this hazard is entirely overcome. The positive rotating means consists of gears 32 carried by the spindles 10 and 11, these gears meshing with gears 33 formed on the outer rings of the bearings 21 to 24 inclusive, the gear on the spindle 11 meshing with the gears on the bearings 21 and 22 and the gear on the spindle 10 meshing with the gears on the bearings 23 and 24. When the spindles are started, therefore, the journal contacting elements of the bearings are positively set into rotation.

The spindles are formed with tapered drill seats 34 which at their reduced ends communicate with internally threaded sockets 35 and the drills employed have threaded stems 36 extending from tapered portions 37 at the forward ends of which are shouldered portions 38 from which the drill shanks 39 extend. The tapered portions 37 enter the tapered seats 34 when the stems engage in the threaded sockets 35 but the tapered seats and tapered drill portions are so dimensioned that when the tapered portions are fully seated, the shoulders 38 are spaced from the ends of the spindles 10 and 11. This arrangement provides for the complementary tapered elements perfectly aligning the drills with the spindles.

The spindles are flatted, as indicated at 40, on diametrically opposite sides to provide wrench seats by which the spindles may be held against rotation in removing and attaching drills.

The invention having been described, what is claimed as new and useful is:

1. A boring head comprising a plurality of spindles in laterally close relation and axial parallelism, and anti-friction bearings tangential to the journals of the spindles at spaced points therearound, certain of the bearings being tangential to more than one spindle.

2. A boring head comprising a plurality of spindles in laterally close relation and axial parallelism, anti-friction bearings tangential to the journals of the spindles at spaced points therearound, and positive driving connections between the spindles, certain of the bearings being tangential to more than one spindle.

3. A boring head comprising a drill spindle and anti-friction bearings for the same arranged in a circular series around the spindle and tangential to the journal thereof, the journal contacting members of the bearings having positive driving connections with the spindle.

4. A boring head comprising a drill spindle and anti-friction bearings for the same arranged in a circular series around the spindle and tangential to the journal thereof, the journal contacting members of the bearings having positive driving connections with the spindle consisting of a gear carried by the spindle and gears carried by the spindle contacting members of the bearings and meshing with the spindle carried gear.

5. A boring head comprising a plurality of spindles in laterally close relation and axial parallelism, positive driving connections between the spindles consisting of a gear mounted on each and an idle gear meshing with the spindle carried gears, and anti-friction bearings tangential to the journals of the spindles at spaced points therearound, certain of the bearings being tangential to more than one spindle.

6. A boring head comprising a plurality of spindles in laterally close relation and axial parallelism, anti-friction bearings tangential to the journals of the spindles at spaced points therearound, positive driving means between the spindles and the journal contacting members of the bearings, and a housing in which the spindles and bearings are disposed and enclosing a highly viscous lubricant in which the bearings and spindles rotate.

CLAUDE SHAW.